(12) United States Patent
Walton et al.

(10) Patent No.: US 11,537,273 B1
(45) Date of Patent: *Dec. 27, 2022

(54) COMPOUND ANIMATION SHOWING USER INTERACTIONS

(71) Applicant: Meta Platforms, Inc., Menlo Park, CA (US)

(72) Inventors: Robert Benson Walton, Berkeley, CA (US); Zachary W. Stubenvoll, San Francisco, CA (US); Julia Harter Toffey, San Francisco, CA (US); Skyler Bock, Sunnyvale, CA (US); Silvia Chyou, San Mateo, CA (US); Jordan Richard Honnette, Oakland, CA (US); Wei-Sheng Su, San Ramon, CA (US); Jerod Wanner, Oakland, CA (US); Stefan Casey Parker, Leesburg, VA (US); Renyu Liu, Sunnyvale, CA (US); Rajat Bhardwaj, San Jose, CA (US)

(73) Assignee: Meta Platforms, Inc., Menlo Park, CA (US)

(*) Notice: Subject to any disclaimer, the term of this patent is extended or adjusted under 35 U.S.C. 154(b) by 141 days.

This patent is subject to a terminal disclaimer.

(21) Appl. No.: 17/113,682

(22) Filed: Dec. 7, 2020

Related U.S. Application Data

(63) Continuation of application No. 16/163,976, filed on Oct. 18, 2018, now Pat. No. 10,891,030.

(51) Int. Cl.
*G06F 3/0484* (2022.01)
*G06T 13/80* (2011.01)
(Continued)

(52) U.S. Cl.
CPC .......... *G06F 3/0484* (2013.01); *G06F 3/0482* (2013.01); *G06F 3/04817* (2013.01);
(Continued)

(58) Field of Classification Search
None
See application file for complete search history.

(56) References Cited

U.S. PATENT DOCUMENTS 9,817,625 B1 * 11/2017 Chun .................. G06F 16/5866
10,803,648 B1 10/2020 Walton et al.
(Continued)

OTHER PUBLICATIONS

United States Office Action, U.S. Appl. No. 16/163,956, dated Nov. 22, 2019, 20 pages.
(Continued)

*Primary Examiner* — Sherief Badawi
*Assistant Examiner* — Koorosh Nehchiri
(74) *Attorney, Agent, or Firm* — Fenwick & West LLP

(57) ABSTRACT

An online system presents a content item to users and receives selections of reaction icons from the users. The online system generates a background animation with the selected reaction icons and a foreground animation to be layered on top of the background animation. The online system sends the background and foreground animations to a client device to be cached. Further, the online system presents the content item to a viewing user associated with the client device and receives a selection of a reaction icon from the viewing user. The online system selects a subset of the users based on the viewing user's affinity to the users, retrieves images of the selected users, and send the images to the client device. The client device customizes the background and foreground animations based on the images and the viewing user's reaction icon to generate a compound animation for display to the viewing user.

18 Claims, 8 Drawing Sheets

(51) Int. Cl.
*G06F 3/04817* (2022.01)
*G06F 3/0482* (2013.01)
*G06F 16/54* (2019.01)
*G06F 16/9535* (2019.01)
*G06F 16/2457* (2019.01)

(52) U.S. Cl.
CPC ........ *G06F 16/24578* (2019.01); *G06F 16/54* (2019.01); *G06F 16/9535* (2019.01); *G06T 13/80* (2013.01)

(56) References Cited

U.S. PATENT DOCUMENTS

| | | | |
|---|---|---|---|
| 2008/0235368 A1 | 9/2008 | Nagaraj et al. | |
| 2010/0049534 A1* | 2/2010 | Whitnah | G06Q 50/01 |
| | | | 705/319 |
| 2011/0225515 A1* | 9/2011 | Goldman | G06Q 50/01 |
| | | | 715/753 |
| 2012/0215771 A1* | 8/2012 | Steiner | G06F 16/24578 |
| | | | 707/723 |
| 2013/0031475 A1* | 1/2013 | Maor | A63F 13/87 |
| | | | 715/706 |
| 2014/0292768 A1 | 10/2014 | Tobin | |
| 2015/0091891 A1 | 4/2015 | Raheman et al. | |
| 2016/0193530 A1* | 7/2016 | Parker | H04N 21/8549 |
| | | | 463/29 |
| 2016/0219006 A1* | 7/2016 | Yuen | H04L 51/063 |
| 2016/0225409 A1 | 8/2016 | Eris | |
| 2016/0300252 A1* | 10/2016 | Frank | G06F 16/24578 |
| 2017/0177554 A1* | 6/2017 | Emmons | G06F 40/151 |
| 2017/0295249 A1 | 10/2017 | Vickrey et al. | |
| 2017/0315699 A1* | 11/2017 | Markus | H04N 21/8146 |
| 2018/0067641 A1* | 3/2018 | Lerner | H04N 21/4788 |
| 2018/0181661 A1 | 6/2018 | Iron et al. | |
| 2018/0300042 A1* | 10/2018 | Clediere | G06Q 50/01 |

OTHER PUBLICATIONS

United States Office Action, U.S. Appl. No. 16/840,265, dated Feb. 19, 2021, 25 pages.

* cited by examiner

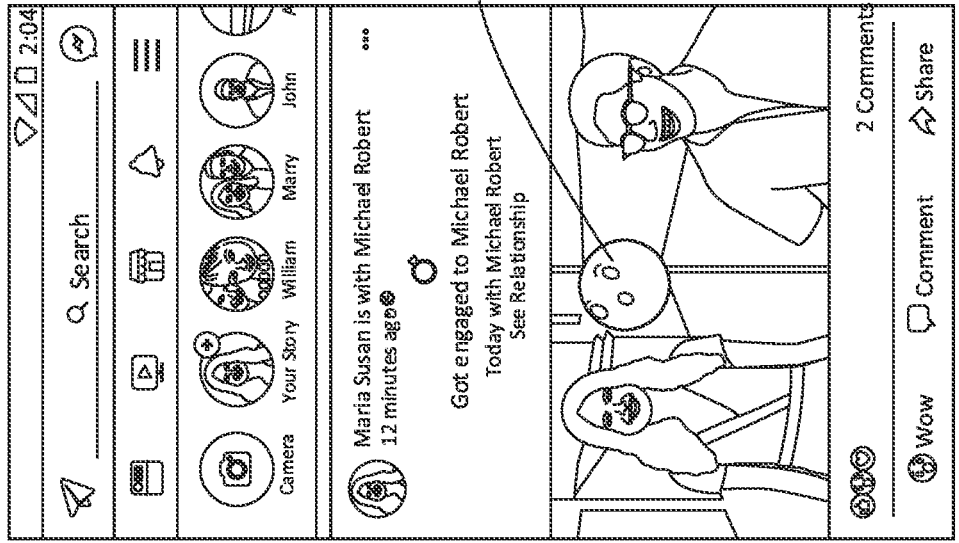
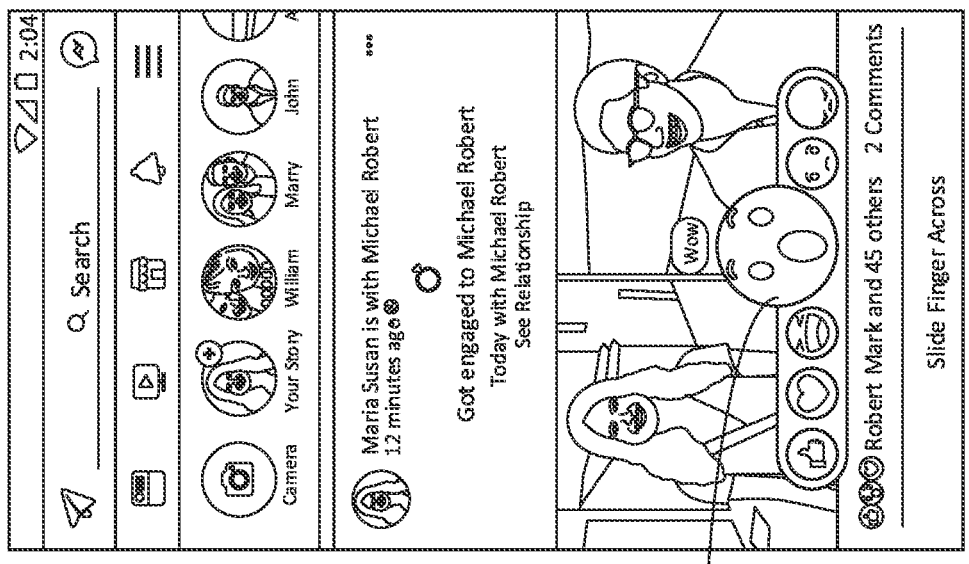
FIG. 4B

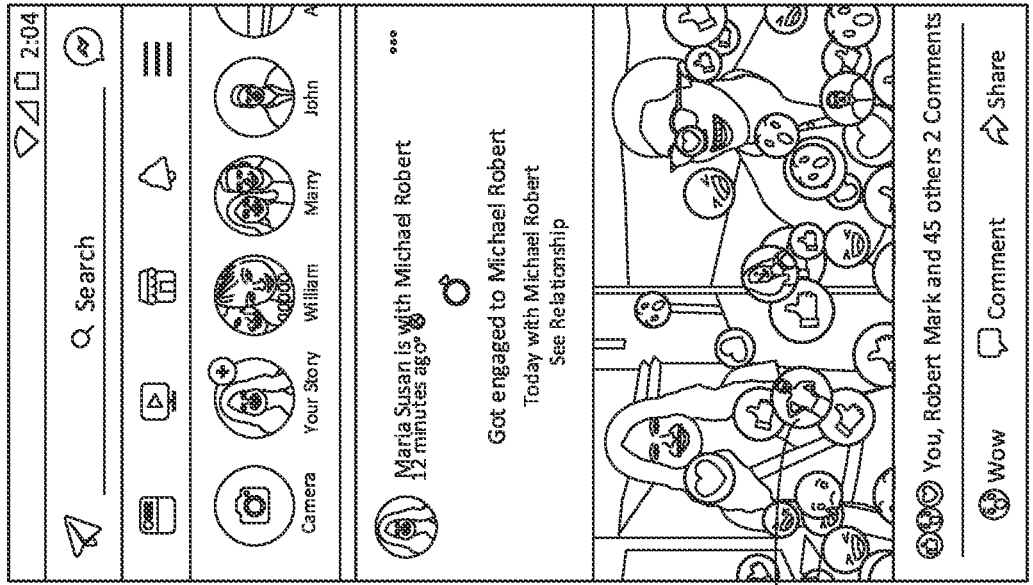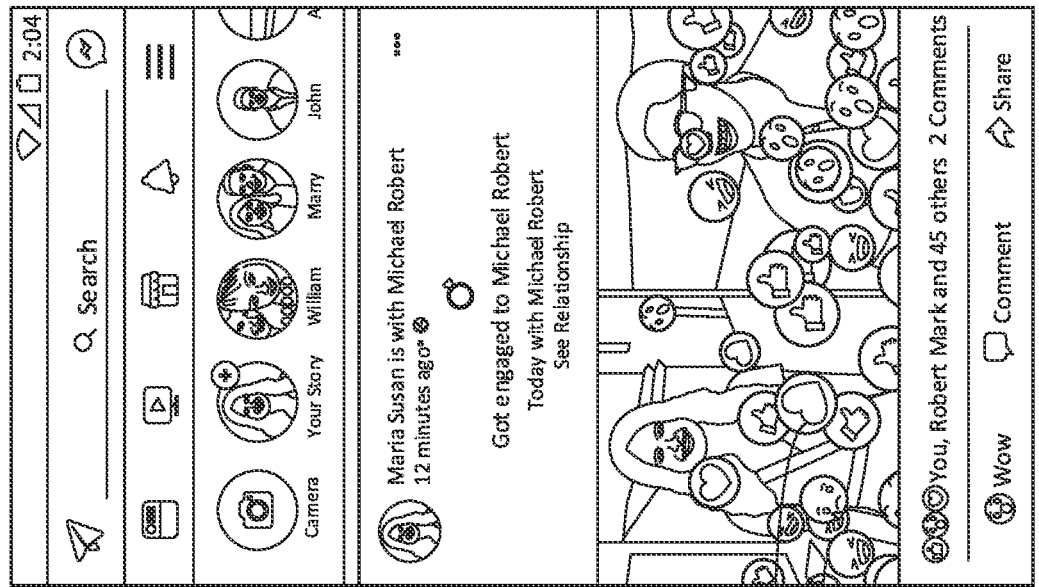
FIG. 4C

510
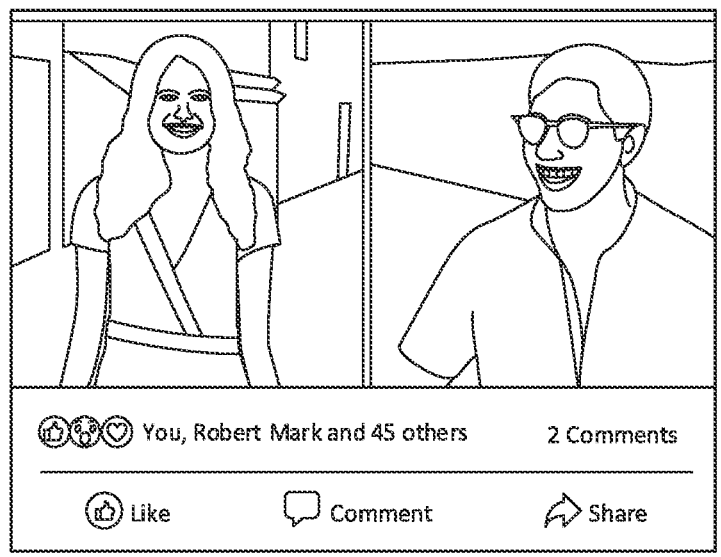
520
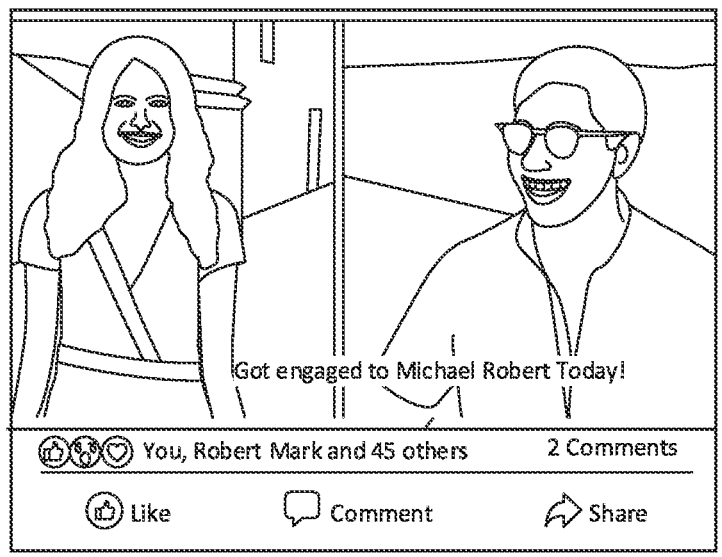
FIG. 5

COMPOUND ANIMATION SHOWING USER INTERACTIONS

CROSS REFERENCE TO RELATED APPLICATIONS

This application is a continuation of co-pending U.S. application Ser. No. 16/163,976, filed Oct. 18, 2018, which is incorporated by reference in its entirety.

BACKGROUND

This disclosure relates generally to online content delivery and, in particular, to generating a compound animation showing user interactions with a content item.

Online systems have become increasingly prevalent in digital content distribution and consumption, and they allow users to more easily communicate with one another. Users of online systems, such as social networking systems, may associate with other online system users, forming a web of connections. Additionally, users may share personal information and other stories with other users connected to them via an online system. Examples of information shared by online system users include videos, music, contact information, background information, job information, interests, photos, notes, and/or other member-specific data.

Online systems store content items, such as video files, audio files, pictures, documents, etc., for presenting to users of the online system. These content items can be created by the online system, uploaded by online system users, or received from third parties. Online system users may interact with content items presented to them in various ways. For example, an online system user may access, express reaction to, comment on, share, or hide content items presented to them.

Online systems may wish to promote engagement of users with one another and with online content. Current existing methods allow users to interact with content items, but have limited ability spotlight user interactions to make them more noticeable or interesting. It is also technically difficult for an online system to present complex user interactions in real time when the interaction is occurs given that the online system can have millions or billions of users, each of whom can view or interact with different content constantly.

SUMMARY

In various embodiments of the invention, an online system provides information and instructions to a client device to generate a compound animation for showing animated content or user interactions to a viewing user associated with the client device. The compound animation shows animated content or user interactions that are of interest to the viewing user, such as an interaction performed by the viewing user himself or interactions performed by users with whom the viewing user has a strong affinity.

In one example, the online system creates compound animations from content items posted by users in the online system. The system receives a content item including content (e.g., an image or text) from a posting user. The online system identifies within the content item posted by the user that an event has occurred. For example, this can be a major life event (e.g., graduation, engagement, wedding, child birth, etc.). The system then upgrades the content item to a new or revised content item specific to the life event, and provides the upgraded content item for display to users as a content item representing the major life event. The upgrade can include adding various different compound animations to the content item.

In one embodiment, the online system provides a compound animation in the content item that includes one or more layers. The layers can include a background and foreground, where at least one of the two is animated, such as a photo the zooms in or out as one layer and text animating onto the photo as another layer. As another example, the system can generate a background animation showing reaction icons indicating reactions of users to the content item, and a foreground animation to be layered on top of the background animation. The online system can also generate instructions to the client device to customize the background and foreground animations to the viewing user. The online system sends one or both of the background and foreground animations to the client device to cache them in a computer cache such that they can be quickly retrieved to generate the compound animation as the user is viewing the content item.

As one example of a compound animation, the online system can animate reaction icons (e.g., representations of a user's reaction, such as like, love, amusement, astonishment, sad, or angry) selected for a content item (e.g., the upgraded major life event content item). To emphasize the reaction, the online system can show not only the user's reaction, but the reaction icons of some or all of the prior users who have interacted with the content item to indicate a celebration or an explosion of reactions to an important event represented by the content item. In one embodiment, the online system customizes a compound animation for the viewing user by replacing some of the reaction icons with profile images of close friends of the user. For example, when the viewing user selects a reaction icon for a content item, the system identifies a subset of users with whom the viewing user has strong affinity, retrieve images of the identified users, and send the images to the client device to fill certain slots in the animation. Where the reaction explosion is created using layers (e.g., background and foreground animations) stored at the client device, the client device can retrieve the background and foreground animations from the cache. The client device can add the retrieved images into the background animation of the explosion of reactions as additional icons and can also customize the foreground animation based on the reaction icon selected by the viewing user. Then the client device places the foreground animation on top of the background animation or otherwise layers them to create a compound animation, and presents the compound animation to the viewing user. From the compound animation, the viewing user can see an animation of his/her own reaction icon as well as an animation of reaction icons selected by other users. The viewing user also can identify his/her close friends who reacted to the content item from the images.

Because the background and foreground animations can be cached in the client device in advance, and rendering of the compound reaction animation is done locally, the delay between the viewing user's selection of the reaction icon and the presentation of the compound reaction animation to the viewing user is minimal. The user does not have to wait for the online system to create the compound animation and transmit it to the client device. Also, it saves computer power consumption of the online system since it does not have to generate a compound animation for every selection of a reaction icon by each of its users, since the online system can have millions or even billions of users.

BRIEF DESCRIPTION OF THE DRAWINGS

FIG. 4B shows the foreground layer of the compound animation in FIG. 4A, in accordance with an embodiment.

FIG. 4C shows the background layer of the compound animation in FIG. 4A, in accordance with an embodiment.

FIG. 5 shows an example of a compound animation generated in response to a viewing user's request for a content item, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
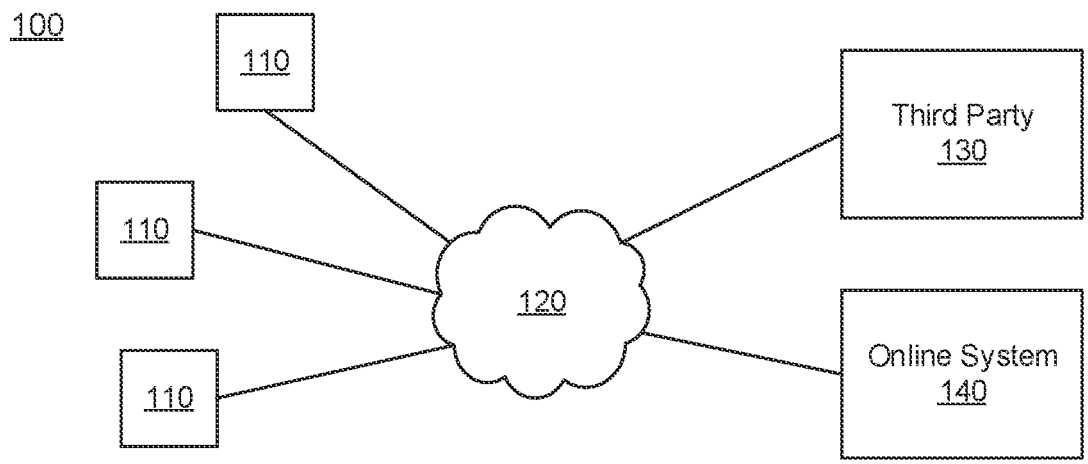
FIG. 1 is a block diagram of a system environment in which an online system operates, in accordance with an embodiment.

FIG. 1 is a block diagram of a system environment 100 in which an online system 140 operates, in accordance with an embodiment. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In some embodiments, a client device 110 includes or is otherwise associated with a computer cache that is configured to cache data (e.g., animations and instructions for customizing animations) received from the online system 140. The client device 110 also renders animations based on instructions from the online system 140 and provides the rendered animations for display to a user.

The client devices 110 are configured to communicate with one or more third party systems 130 and the online system 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
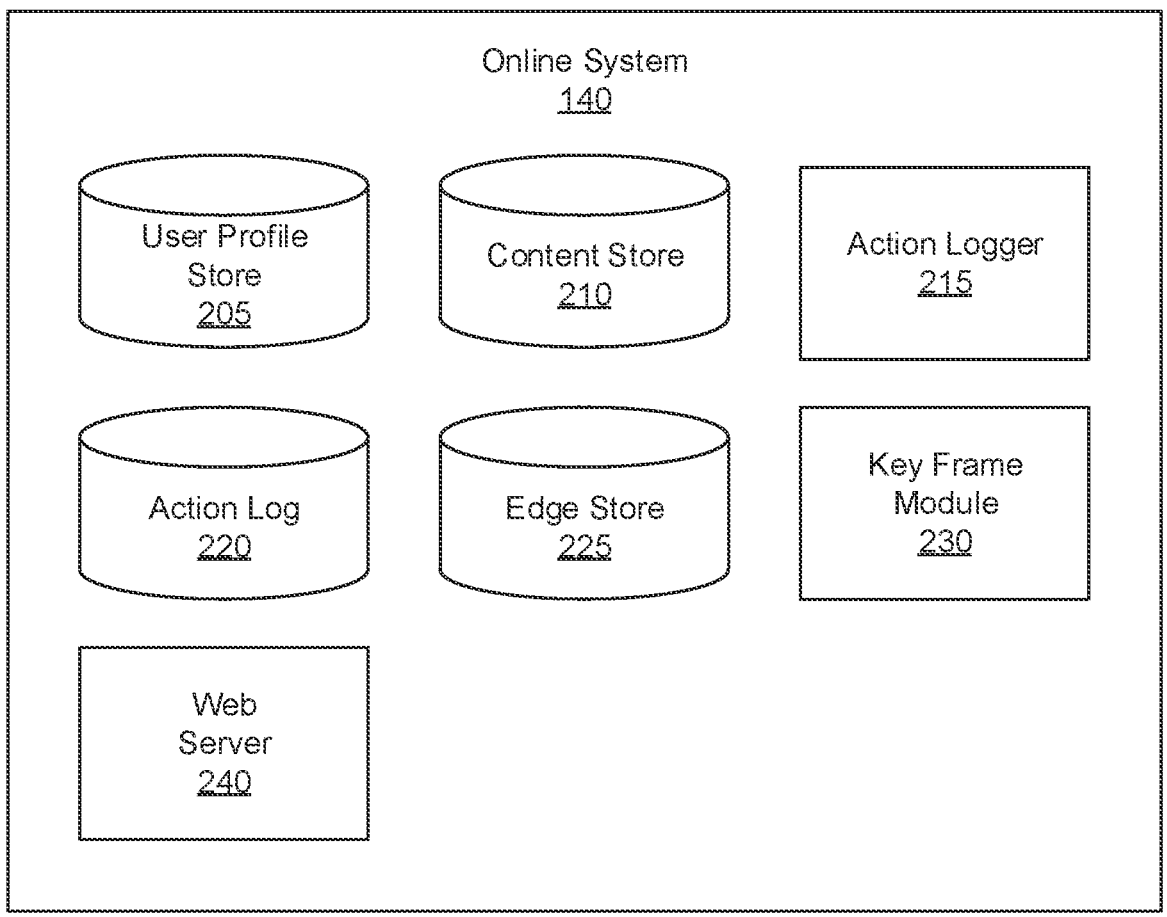
FIG. 2 is a block diagram of the online system in which a key frame module operates, in accordance with an embodiment.

FIG. 2 is a block diagram of the online system 140 in which a key frame module 230 operates, in accordance with an embodiment. The online system 140 shown in FIG. 2 includes a user profile store 205, a content store 210, an action logger 215, an action log 220, an edge store 225, the key frame module 230, and a web server 250. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220. A user profile may also include identification information of the user, including a user name, an email address, a physical address, a number, an image, or any combination thereof.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, the online system 140 may create objects based on content from users. For example, the online system 140 may identify a major life event from content received from a user. The major life event can be graduation, engagement, marriage, child birth, moving, changing of a job, etc. The online system 140 may create an object representing the major life event. The object may include the content from the user and may also include other content posted by other users or created by the online system 140. In some embodiments, objects are received from third-party applications that are separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with one another and increases the frequency with which users interact within the online system 140.

The content store 210 stores content items for presentation to a user. Content of a content item can be text, image, audio, video, or any other suitable data presented to a user. In various embodiments, the content of a content item also specifies a page of content. For example, a content item includes a landing page specifying a network address of a page of content to which a user is directed when the content item is accessed.

In some embodiments, a content item is associated with a bid amount. The bid amount is included in the content item by a user and is used to determine an expected value, such as monetary compensation, provided by an advertiser to the online system 140 if the content item is presented to a user, if the content item receives a user interaction when presented, or if any suitable condition is satisfied when the content item is presented to a user. For example, the bid amount included in a content item specifies a monetary amount that the online system 140 receives from a user who provided the content item to the online system 140 if the content item is displayed. In some embodiments, the expected value to the online system 140 of presenting the content item may be determined by multiplying the bid amount by a probability of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information.

Various content items may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. The online system 140 logs interactions between users presented with the content item or with objects associated with the content item. Additionally, the online system 140 receives compensation from a user associated with a content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these user interactions is stored in the action log 220. Examples of user interactions with objects include: commenting on posts, sharing links, checking-in to physical locations via a client device 110, accessing content items, and any other suitable interactions. Additional examples of user interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were interacted, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The key frame module 230 provides information and instruction to a client device 110 to generate a compound animation for display to a viewing user associated with the client device 110. The compound animation shows animated content, such as user interactions that are of interest to the viewing user. For example, these can be interactions performed by the viewing user himself or interactions performed by users with whom the viewing user has a strong affinity. The compound animation may also show a portion of the content item or the whole content item.

In some embodiments, the key frame module 230 receives from a user content for display to other online system users as a content item or a story or post within the online system. The content item/story/post is posted within the online system for other users to view. Then, the key frame module 230 can identify from the content item that it includes an event, such as a major life event of the user (e.g., a wedding, engagement, graduation, child birth, etc.). The system then generates a revised or upgraded content item into a new content item that is focused on or redesigned to represent the major life event. A user can perform various types of interactions with the content item. For instance, a user may be provided with reaction icons (like, love, amusement, astonishment, sad, and angry), from which the user can select one to show his/her reaction to the content item. A user may also make a comment on the content item.

Further, the key frame module 230 can also provide a compound animation. This can be for the upgraded content item focused around the life event, or it can be for any content item that a user posts in the online system. The compound animation can include one or more layers. One or more of the layers can include animated content. One layer can be placed on top of another layer to create the compound animation, such that there is a foreground and a background in the animation. In some cases, there can be one or more foregrounds and one or more backgrounds. The animations can be of any portion of the content item, including an animation of an image posted by the user, an animation of text posted by the user, an animation of reactions or comments of the user or other users, etc. For example, there can be a static image in the background with text that animates in for the foreground. As another example, there can be an animated image that zooms in or out slowly or pans across an area of the image as one layer, with another layer showing static or animated text (e.g., text posted by the user or comments from other users). As a further example, reaction icons of the user or of other users can be shown as animations in the layers.

In one example, the module 230 generates a reaction explosion compound animation with a background animation and a foreground animation to be layered on top of the background animation. The background and foreground animations show interactions performed by users with the content item and may also show a portion of the content item. The background and foreground animation may include open slots that can be customized. In one example, the background animation is an animation of reaction icons selected by users other than the viewing user, and the foreground animation is an animation that can be customized to show a reaction icon selected by the viewing user. In another example, the background animation is an animation of an image included in the content item and the foreground animation that can be customized to show comments of the viewing user or other users. The key frame module 230 can send one or both of the background and foreground animations to the client device 110 to be cached in a computer cache.

The key frame module 230 can then, at a later time, receive a request for a compound animation from the client device 110. The request can either be a request for the content item from the viewing user or an interaction performed by the viewing user with the content item. In response to the request, the key frame module 230 obtains additional information for customizing the background and/or foreground animations for the viewing user. In one embodiment, the additional information is information of the viewing user, such as a reaction icon selected by the viewing user or a comment made by the viewing user. In another embodiment, the additional information is information of users with whom the viewing user has strong affinity. For example, the key frame module 230 selects a group of users from users who have interacted with the content item based on the viewing user's affinity with the users. The key frame module 230 then retrieves information of the selected users for customizing the background animation and/or foreground animation. The retrieved information can be images of the selected users or interactions made by the selected users with the content item.

Additionally, the key frame module 230 generates an instruction to customize the background and/or foreground animation with the additional information. An example of the instruction is to add the additional information into the open slots of the background and/or foreground animation. Another example is to select a foreground (or background) animation from a plurality of foreground (or background) animations based on the viewing user's reaction. The key frame module 230 sends the additional information and instruction to the client device 110. The client device 110 retrieves the background and foreground animations from the cache and modifies them with the additional information in accordance with the instruction. The client device 110 then layers the foreground animation on top of the background animation to generate a compound animation. More details about the key frame module 230 are described in conjunction with FIG. 3.

The web server 250 links the online system 140 via the network 120 to the one or more client devices 110, as well as to the one or more third party systems 130. The web server 250 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 250 to upload information (e.g., images or videos) that are stored in the content store 210. Additionally, the web server 250 may provide application programming interface (API) functionality to send data directly to native client device operating systems, such as JOS®, ANDROID™, or BlackberryOS.

Compound Animation Generation

Figure 3:
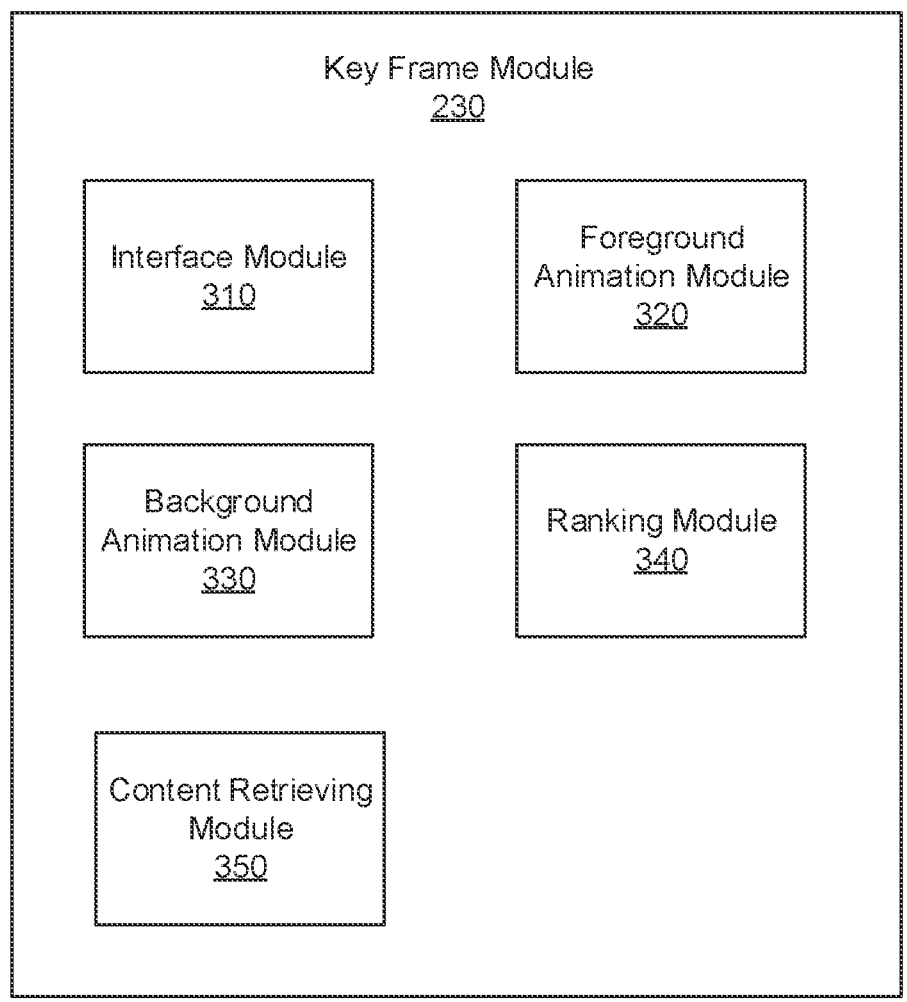
FIG. 3 is a block diagram of the key frame module, in accordance with an embodiment.

FIG. 3 is a block diagram of the key frame module 230, in accordance with an embodiment. As discussed above, the key frame module 230 provides information and instructions to a client device 110 to generate a compound animation of user interactions for display to a viewing user. The key frame module 230 in the embodiment of FIG. 3 includes an interface module 310, a foreground animation module 320, a background animation module 330, a ranking module 340, and a content retrieving module 350. In other embodiments, the content distribution module 230 may include additional, fewer, or different components for various applications.

The interface module 310 facilitates communication of the key frame module 230 with other entities. For example, the interface module 310 receives a content item from a posting user or retrieves a content item from the content store 210. The interface module 310 can also retrieve information of users from the action log 220 and the user profile store 205. As another example, the interface module 310 receives a request for a compound animation from the client device 110. The request can either be the viewing user's request for the content item (e.g., a click of a link to the content item) or an interaction performed by the viewing user with the content item. The interface module 310 can send information and instructions generated by the key frame module 230 to the client device 110 to generate a compound animation.

The foreground animation module 320 generates a foreground animation and an instruction to customize the foreground animation to the viewing user. In one example, the foreground animation module 320 generates a plurality of animations, each of which represents a particular type of user interaction. The foreground animation module 320 generates an instruction to the client device to select one of the animations based on a user interaction performed by the viewing user. In another example, the foreground animation module 320 generates an animation that includes one or more open slots, and also generates an instruction to the client device 110 to fill the open slots with further information from the key frame module 230.

The background animation module 330 generates a background animation. In one embodiment, the background animation is an animation of a portion of the content item. For example, it is a zoom into an image of the content item. In another example, the background animation shows user interactions with the content item performed by users other than the viewing user. The user interactions can be comments on the content item or reaction icons representing reactions of the users to the content item. In some embodiments, the background animation module 330 may also generate an instruction to the client device 110 to customize the background animation based on future information from the key frame module 230, e.g., an instruction to fill the open slots in the background animation with further information from the key frame module 230. The key frame module 230 can send the foreground and background animations and the instructions to the client device 110 to be cached in a computer cache.

The ranking module 340 ranks, in response to a request received from the client device 110, a group of users who have interacted with the content item based at least on the viewing user's affinity with each user in the group. For example, the ranking module 340 determines an affinity score for each user in the group that indicates the viewing user's affinity with the user and ranks the users in the group according to their affinity scores. The affinity score of a user can be determined based on multiple factors, including the viewing user's direct connection with the user, the viewing user's interaction with the user, number of content items with which the viewing user and the user both have interacted, number of users with which the viewing user and the user both connect, etc. In some embodiments, the ranking module 340 also determines another affinity score for each user in the group based on the posting user's affinity to the user and ranks the users in the group based on a combination of the two types of affinity scores.

The content retrieving module 350 identifies a subset of users from the group of users and retrieves information of the identified users. The retrieved information can be images of the identified users stored in the user profile store 205 or interactions performed by the selected users (e.g., comments) that are stored in the action log 220. In some embodiments, the number of the users in the subset equals the number of open slots in the foreground animation or the background animation. The retrieved information is sent to the client device 110 to customize the foreground animation and/or the background animation. The client device 110 may, under an instruction from the foreground animation module 320 (or the background animation module 330), add the retrieved information into the foreground animation (or the background animation).

Figure 4A:
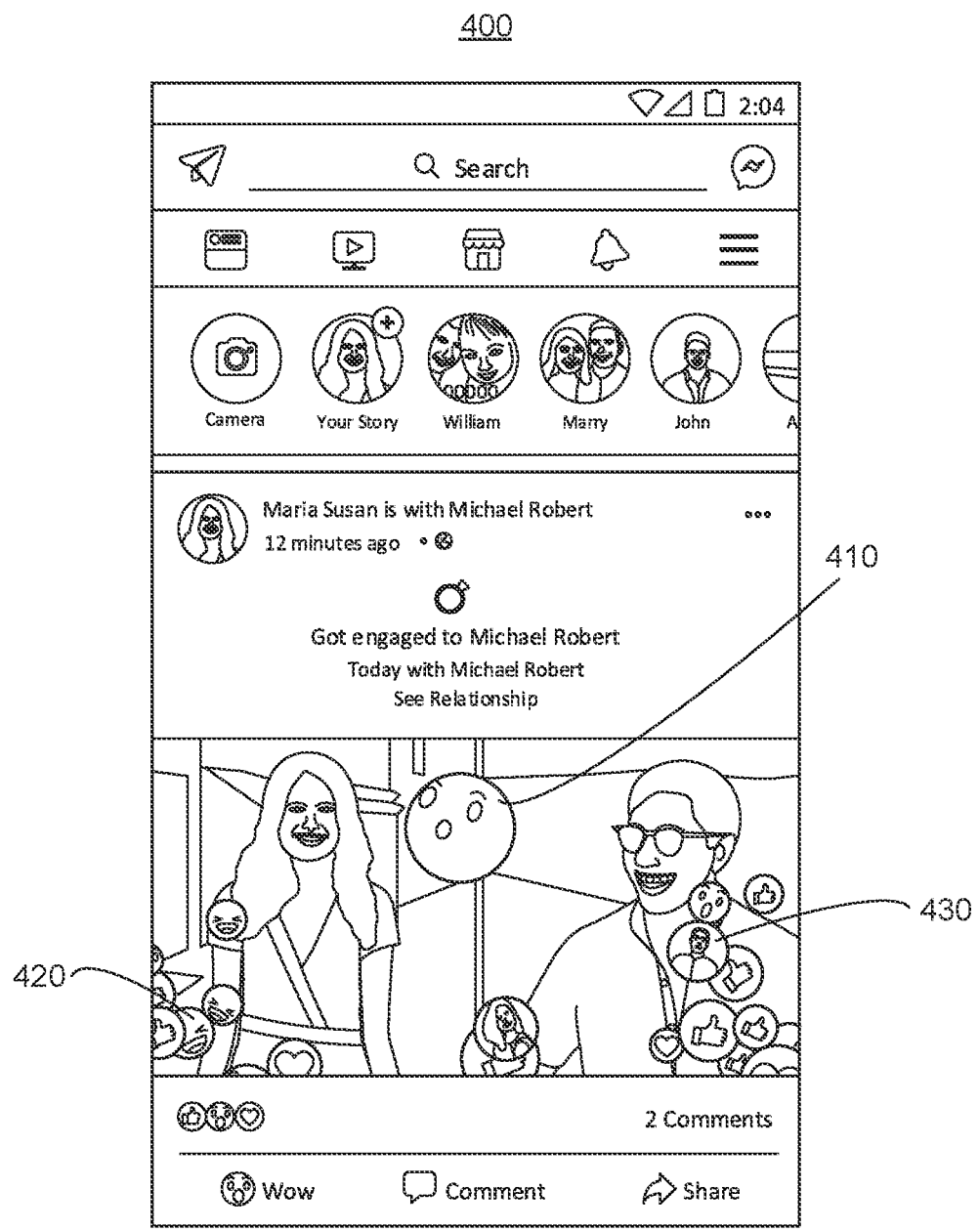
FIG. 4A shows an example of a compound animation generated in response to a viewing user's reaction to a content item, in accordance with an embodiment.

FIG. 4A shows an example of a compound animation 400 generated in response to a viewing user's reaction to a content item, in accordance with an embodiment. The content item is an image showing an engagement announcement for two users. The compound animation 400 is a compound reaction animation, i.e., an animation showing reaction icons. The compound animation 400 includes a reaction icon 410 representing astonishment that is larger than the other icons. The compound animation 400 also includes a group of smaller reaction icons 420 that represent like, love, and amusement. Additionally, the compound animation 400 includes a few image icons 430 that are filled or replaced with user profile images. The reaction icon 410 is selected by the viewing user, Maria Susan. The reaction icons 420 are reactions that have been selected by other users previously who reacted to the engagement image. The reaction icons 420 have different sizes. In one embodiment, the size of the reaction icon 420 is determined based on a number of users who have selected the reaction icon, such that the size of the reaction icon 420 can be larger if more people have selected it. In another embodiment, the size of a reaction icon 420 is determined based on the viewing user's affinity with the user who selected the reaction icon. The image icons 430 show profile images of a subset of the users who reacted to the content item. The users in the subset can be selected based on the viewing user's affinity with them. For example, the viewing user and the users in the subset may be connected as friends in the online system, and the viewing user may interact with certain of the friends within the online system more often than others, hence showing a higher affinity for those friends. In some embodiments, the image icons are filled or replaced with reaction icons selected by the users in the subset at the beginning of the compound animation. Later in the compound animation, the reaction icons 420 flip over to display the image icons 430.

As shown in FIG. 4A, the reaction icon 410 moves up from the bottom of the engagement image to the top of the engagement image, followed by the reaction icons 420 and image icons 430. Even though not shown in FIG. 4A, the compound animation also includes the reaction icon 410, reaction icons 420, and image icons 430 moving down and eventually disappearing. The compound animation 400 ends when the icons have disappeared. Through the compound animation 400, the viewing user can see an animation of her own reaction (which is emphasized via the larger sized icon) as well as reactions of other users to the content item. In some embodiments, the viewing user's own reaction icon is animated such that the icon dances or moves around to match the reaction it represents. Also, the viewing user can identify her friends who have reacted to her engagement image due to the image icons.

The compound animation 400 is generated by placing a foreground layer on top of a background layer. FIG. 4B shows the foreground layer of the compound animation 400 in FIG. 4A, in accordance with an embodiment. The foreground layer is an animation of the reaction icon 410. FIG. 4B includes two frames 440 and 450 of the foreground layer. As shown in the frame 440, six reaction icons are presented, including like, love, haha, wow, sad, and angry. The reaction icon 410 is enlarged as the viewing user hovers over or selects it. Next, the reaction icon 410 moves from the bottom of the image to the top of the image, as shown in the frame 450.

FIG. 4C shows the background layer of the compound animation 400 in FIG. 4A, in accordance with an embodiment. FIG. 4C includes two frames 460 and 470. The frame 460 shows a plurality of reaction icons 420 over the image. The reaction icons 420 are selected by users other than the viewing user. Some of the reaction icons 420 are flipped over to image icons 430 in the frame 470. In some embodiments, the layer in FIG. 4C is a foreground layer that is placed on top of the layer in FIG. 4B.

FIG. 5 shows an example of a compound animation generated in response to a viewing user's request for a content item, in accordance with an embodiment. The viewing user's request can be a click of a link to the content item or can be an opening of a mobile application or loading of a news feed. The content item in FIG. 5 is an image showing an engagement announcement. FIG. 5 includes two frames 510 and 520 of the compound animation. As shown in the two frames 510 and 520, the compound animation includes a zoom into the engagement image and an animation of text on the engagement image (e.g., the posted text sliding up to or across, or otherwise animating onto, the engagement image). In one embodiment, the comments of other users can also animate onto the user interface or onto the photo, and these can be selected based on the viewing user's affinity with each of the users so that the viewing user can see how his close friends commented on the engagement image.

The compound animation is generated by placing a foreground layer on top of a background layer. In one embodiment, the foreground layer is the animation of the text and the background layer is the animation of the engagement image. In another embodiment, the background layer is the animation of the text and the foreground layer is the animation of the engagement image. At the end of the compound animation, the engagement image goes back to its original size and the text moves off from the engagement image.

Figure 6:
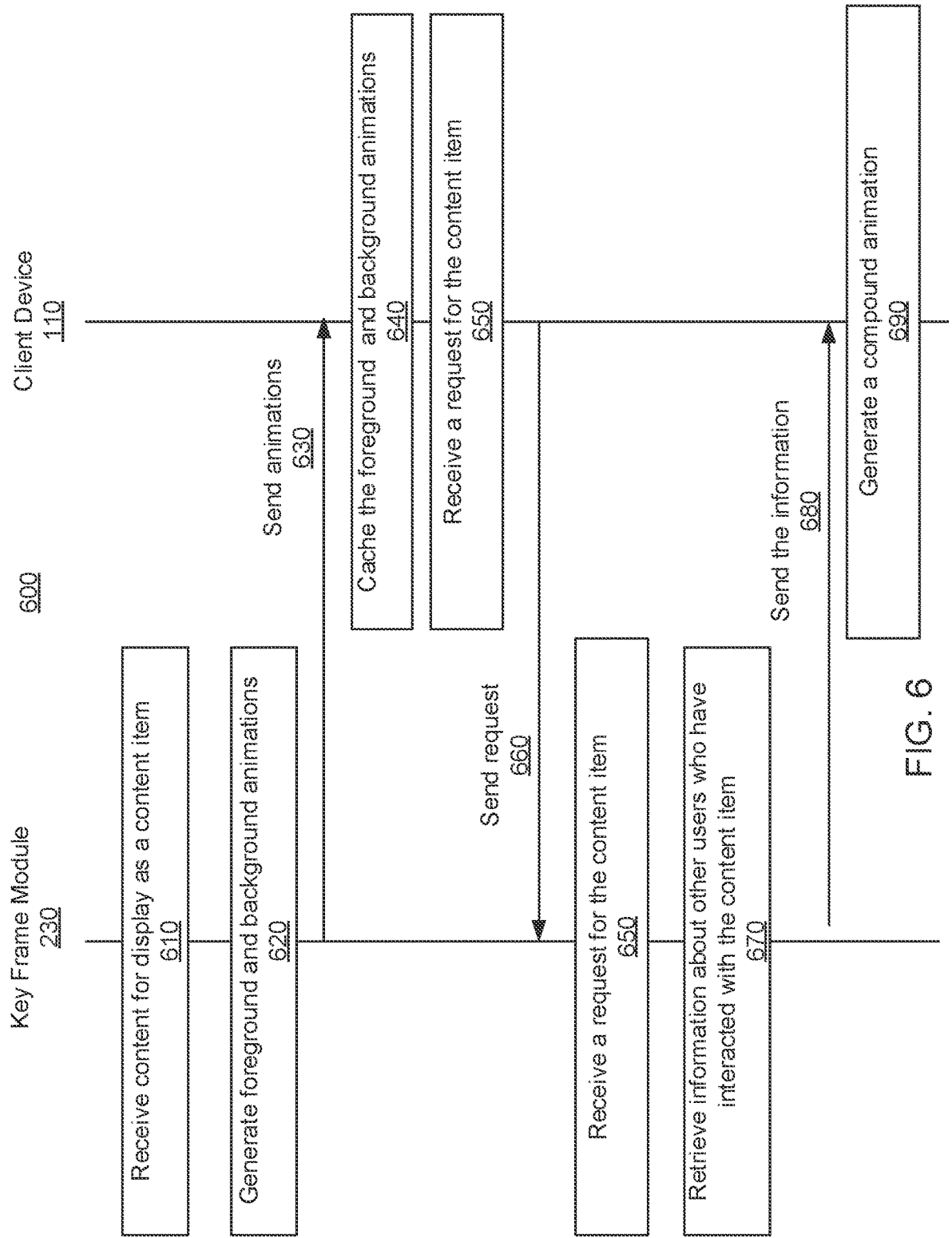
FIG. 6 is a flowchart illustrating a process of generating a compound animation that includes a background animation and a foreground animation, in accordance with an embodiment.

FIG. 6 is a flowchart illustrating a process 600 of generating a compound animation, in accordance with an embodiment. In some embodiments, the process 600 is performed by the key frame module 230 and a client device 110, although some or all of the operations in the method may be performed by other entities in other embodiments. In some embodiments, the operations in the flow chart are performed in a different order and can include different and/or additional steps.

The key frame module 230 receives 610 content for display to a plurality of users as a content item. The content can be an image posted onto the online system 140 by a posting user that is presented in the online system with text posted by the user. Similarly, the content can be any other media (e.g., video) or text. In some embodiments, the key frame module 230 identifies a major life event (such as graduation, engagement, etc.) from the content and creates the content item representing the major life event, though the key frame module 230 can use any content item. The key frame module 230 generates 620 a foreground animation and a background animation. These can include at least a portion of the content item. The key frame module 230 sends 630 the foreground and background animations to the client device 110. The client device 110 caches 640 these animations.

The client device 110 then at some point receives 650 a request for the content item from a user. The client device 110 can send 660 the request to the key frame module 230. In response to the received request, the key frame module 230 retrieves 670 information to allow one or both of the foreground and background animations to be modified or customized to the user. For example, the module 230 can retrieve certain information about the viewing user or about other users who have interacted with the content item. An example of the retrieved information is one or more comments made by the other users on the content item. Another example is text posted by the posting user with the content item or describing a photo in a content item. The posted text or comments of other users can animate into the photo in a foreground layer over the background layer that is simultaneously showing the photo zooming in or out. The key frame module 230 sends 680 the information to the client device 110. Receiving the retrieved information, the client device 110 generates 690 a compound animation. For example, the client device 110 adds the comments or posted text in the foreground animation so that the foreground animation shows movement of the comments/text. The client device 110 further places the foreground animation on top of the background animation to generate the compound animation.

Figure 7:
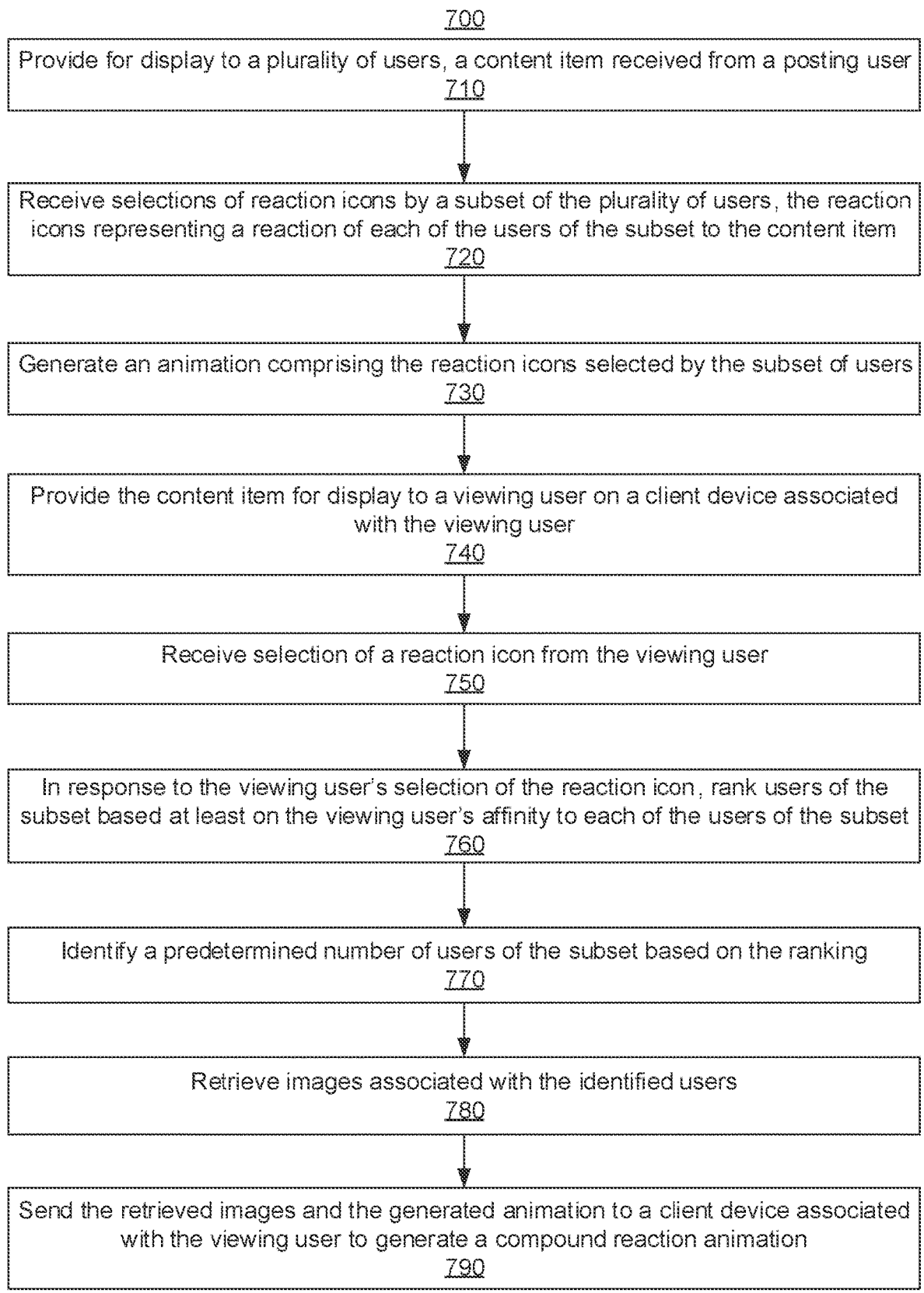
FIG. 7 is a flowchart illustrating a process of generating a compound reaction animation, in accordance with an embodiment.

FIG. 7 is a flowchart illustrating a process 700 of generating a compound reaction animation, in accordance with an embodiment. In some embodiments, the process 700 is performed by the key frame module 230, although some or all of the operations in the method may be performed by other entities in other embodiments. In some embodiments, the operations in the flow chart are performed in a different order and can include different and/or additional steps.

The key frame module 230 provides 710, for display to a plurality of users, a content item received from a posting user. The key frame module 230 receives 720 selections of reaction icons by a subset of the plurality of users. A user can select a reaction icon from different types of reaction icons that represent different reactions to the content item, including, for example, like, love, amusement, astonishment, sad, and angry. The key frame module 230 generates 730 an animation (i.e., a background animation) comprising the reaction icons selected by the subset of users. An example of the animation is the reaction icons flying in from the bottom of the content item. In some embodiments, the key frame module 230 also generates a foreground animation to be layered on top of the background animation. One or both of the background and foreground animations can be customized to the user such that they include user specific information, such as profile images of friends of the user. In some embodiments, the key frame module 230 provides an animation authoring environment that allows users to create animations. And, the key frame module 230 may generate the background and/or foreground animation based on animations created by users though the animation authoring environment.

Further, the key frame module 230 provides 740 the content item for display to a viewing user on a client device associated with the viewing user and receives 750 selection of a reaction icon from the viewing user. In response to the viewing user's selection of the reaction icon, the key frame module 230 ranks 760 users of the subset based at least on the viewing user's affinity to each of the users. In some embodiments, the key frame module 230 ranks the users based on a combination of the viewing user's affinity to them and the posting user's affinity to them. The key frame module 230 identifies 770 a predetermined number of users of the subset based on the ranking and retrieves 780 images associated with the identified users.

The key frame module 230 sends 790 the retrieved images and the generated animation to the client device 110 associated with the viewing user to generate a compound reaction animation that includes the reaction icon selected by the viewing user and the animation of the reaction icons selected by the subset of users with the retrieved images as additional icons (i.e., the background icons). The generated animation may be provided in advance to the client device for caching. For example, the key frame module 230 instructs the client device 110 to customize the background animation by adding the images into the background animation or replace some reaction icons of the identified users with the images. Also, the key frame module 230 instructs the client device 110 to customize the foreground animation by adding the reaction icon selected by the viewing user into the foreground animation or by selecting one of the foreground animations generated in advance by the key frame module 230. Each of the foreground animations corresponds to a particular reaction icon and the selected foreground animation corresponds to the viewing user's selected reaction icon. The client device 110 further places the foreground animation on top of the background animation to generate the compound animation.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    generating an animation comprising a plurality of reaction icons associated with a content item;
    providing the content item for display to a viewing user on a client device associated with the viewing user;
    receiving selection of a reaction icon from the viewing user;
    in response to the viewing user's selection of the reaction icon, retrieving images associated with one or more users who are associated with the content item; and
    sending the retrieved images and the generated animation to the client device associated with the viewing user to generate a reaction animation that includes a plurality of layers, each layer comprising one or more of the following: (1) the reaction icon selected by the viewing user, (2) the generated animation, and (3) the retrieved images, wherein the client device is configured to display the reaction animation, and at least a portion of the reaction animation is overlaying the content item.

2. The method of claim 1, wherein retrieving images associated with one or more users who are associated with the content item comprises:
    identifying a plurality of user who have interacted with the content item;
    ranking the plurality of users based at least on the viewing user's affinity to each of the plurality of users, the viewing user's affinity indicating the viewing user's interest in each of the plurality of users;
    selecting the one or more users from the plurality of users based on the ranking.

3. The method of claim 2, wherein the plurality of users are ranked further based on a posting user's affinity to each of the plurality of users, the posting user being a user who posted at least part of the content item, the posting user's affinity indicating the posting user's interest in each of the plurality of users.

4. The method of claim 1, wherein retrieving images associated with one or more users who are associated with the content item comprises:
    identifying a plurality of user who have interacted with the content item;
    ranking the plurality of users based at least on a posting user's affinity to each of the plurality of users, the posting user being a user who posted at least part of the content item, the posting user's affinity indicating the posting user's interest in each of the plurality of users;
    selecting the one or more users from the plurality of users based on the ranking.

5. The method of claim 1, wherein each of the reaction icons in the generated animation has a size that is determined based on a number of users who have selected the reaction icon.

6. The method of claim 1, wherein the generated animation is sent to the client device before the retrieved images are sent to the client device and the client device is configured to cache the generated animation in a computer cache and retrieve the generated animation from the computer cache to generate the reaction animation after the retrieved images are sent to the client device.

7. The method of claim 1, further comprising:
    generating a plurality of animations, each animation comprising a particular type of reaction icon;
    sending the plurality of animations to the client; and
    in response to the viewing user's selection of the reaction icon, instructing the client device to select one of the plurality of animations, the selected animation comprising the reaction icon selected by the viewing user.

8. The method of claim 1, wherein the one or more users had previously selected one or more reaction icons of the plurality of reaction icons in the generated animation and the layer comprising the reaction animation shows that the one or more reaction icons selected by the one or more users flip over to the retrieved images.

9. The method of claim 1, wherein a reaction icon represents one of the following reactions: like, love, amusement, astonishment, sad, and angry.

10. A non-transitory computer readable medium storing executable computer program instructions, the computer program instructions comprising instructions that when executed cause a computer processor to:
generate an animation comprising a plurality of reaction icons associated with a content item;
provide the content item for display to a viewing user on a client device associated with the viewing user;
receive selection of a reaction icon from the viewing user;
in response to the viewing user's selection of the reaction icon, retrieve images associated with one or more users who are associated with the content item; and
send the retrieved images and the generated animation to the client device associated with the viewing user to generate a reaction animation that includes a plurality of layers, each layer comprising one or more of the following: (1) the reaction icon selected by the viewing user, (2) the generated animation, and (3) the retrieved images, wherein the client device is configured to display the reaction animation, and at least a portion of the reaction animation is overlaying the content item.

11. The computer readable medium of claim 10, wherein the computer program instructions for retrieving images associated with one or more users who are associated with the content item comprise instructions that when executed cause the computer processor to:
identify a plurality of user who have interacted with the content item;
rank the plurality of users based at least on the viewing user's affinity to each of the plurality of users, the viewing user's affinity indicating the viewing user's interest in each of the plurality of users;
select the one or more users from the plurality of users based on the ranking.

12. The computer readable medium of claim 11, wherein the plurality of users are ranked further based on a posting user's affinity to each of the plurality of users, the posting user being a user who posted at least part of the content item, the posting user's affinity indicating the posting user's interest in each of the plurality of users.

13. The computer readable medium of claim 10, wherein the computer program instructions for retrieving images associated with one or more users who are associated with the content item comprise instructions that when executed cause the computer processor to:
identify a plurality of user who have interacted with the content item;
rank the plurality of users based at least on a posting user's affinity to each of the plurality of users, the posting user being a user who posted at least part of the content item, the posting user's affinity indicating the posting user's interest in each of the plurality of users;
select the one or more users from the plurality of users based on the ranking.

14. The computer readable medium of claim 10, wherein each of the reaction icons in the generated animation has a size that is determined based on a number of users who have selected the reaction icon.

15. The computer readable medium of claim 10, wherein the generated animation is sent to the client device before the retrieved images are sent to the client device and the client device is configured to cache the generated animation in a computer cache and retrieve the generated animation from the computer cache to generate the reaction animation after the retrieved images are sent to the client device.

16. The computer readable medium of claim 10, the computer program instructions further comprising instructions that when executed cause a computer processor to:
generate a plurality of animations, each animation comprising a particular type of reaction icon;
send the plurality of animations to the client; and
in response to the viewing user's selection of the reaction icon, instruct the client device to select one of the plurality of animations, the selected animation comprising the reaction icon selected by the viewing user.

17. The computer readable medium of claim 10, wherein the one or more users had previously selected one or more reaction icons of the plurality of reaction icons in the generated animation and the layer comprising the reaction animation shows that the one or more reaction icons selected by the one or more users flip over to the retrieved images.

18. The computer readable medium of claim 10, wherein a reaction icon represents one of the following reactions: like, love, amusement, astonishment, sad, and angry.

* * * * *